CAMERA PROTECTIVE APPARATUS

Filed July 11, 1962 2 Sheets-Sheet 1

INVENTOR.
WILLY BORBERG
LOUIS P. RAITIERE

BY H. L. Mackey

ATTORNEY

Aug. 3, 1965 W. BORBERG ETAL 3,198,883

CAMERA PROTECTIVE APPARATUS

Filed July 11, 1962 2 Sheets-Sheet 2

*INVENTOR.*
WILLY BORBERG
LOUIS P. RAITIERE

*BY* [signature]

ATTORNEY

3,198,883
CAMERA PROTECTIVE APPARATUS

Willy Borberg, Briarcliff Manor, and Louis P. Raitiere, Pleasantville, N.Y., assignors to General Precision, Inc., a corporation of Delaware Filed July 11, 1962, Ser. No. 209,144
6 Claims. (Cl. 178—7.2)

This invention relates generally to remotely-controlled television cameras and particularly to a safety feature for such a camera whereby damage to the light-sensitive camera element from inadvertent exposure to direct sunlight is prevented.

Closed circuit television systems employing remotely-controlled cameras are widely used. Such systems provide an operator at a remote location with a monitor and a control panel by which pan, tilt, focus, iris and in some cases lens selection of the camera can be controlled. Such systems are widely used when it is desired to place the camera where it would be inconvenient, dangerous or impossible to place a human operator. A camera may, for example, be placed within a radioactive chamber, on the undercarriage of a highway or rail vehicle, or on top of a pole. The present invention is particularly applicable to a camera placed in an outdoor location and remotely controllable in pan and tilt to scan a large area. With the operator at a remote point, it is quite possible for him to direct the camera toward the sun inadvertently. A television camera is a sensitive device and while it may accommodate a wide range of incident light without injury, exposure to the direct rays of the sun is almost certain to damage the sensitized screen.

It would be possible to protect a camera by employing a light-sensitive element positioned at one end of a cylindrical tube, the other end of which is open. The tube would be mounted with its axis parallel to the optical axis of the camera. If the tube and lens be directed toward the sun, the light-sensitive element would generate a signal which could be used to close the shutter. The length and diameter of the tube could be selected, in conjunction with the viewing angle of the camera lens, so that as the camera moves, sunlight would strike the light-sensitive element before falling upon the sensitive surface of the camera tube thereby enabling the shutter to be closed before the camera tube could be damaged.

Such an arrangement would be a great improvement over no protection at all but would have the disadvantage that, if adjusted to close the shutter as sunlight first strikes the edge of the light-sensitive element, it would also have sufficient sensitivity to close the shutter if the camera were directed toward a bright cloud. Bright clouds frequently are not bright enough to damage the camera and in many applications, such as monitoring aircraft in flight, it is desirable to maintain the camera operative when directed toward such clouds.

It is a general object of the present invention to prevent a television camera from being inadvertently exposed to direct sunlight.

Another object is to prevent exposure of any part of the sensitive element of the camera to direct sunlight while permitting exposure to bright clouds.

Briefly stated, a preferred embodiment of the invention comprises a cylindrical tube mounted on the camera with its axis parallel to the optical axis of the camera. One end of the tube is open while the other end contains a circular light-sensitive element such as a photoresistor. The central portion of the element is covered with a circular disc of opaque material, leaving an effective area in the form of a plane annulus or ring, that is, a plane surface bounded by two concentric circles. When the camera and tube are turned slowly toward the sun, a small portion of the photoresistor near one edge between the bounding circles becomes illuminated first. The length and diameter of the tube are selected in conjunction with the viewing angle of the camera lens so that this position is illuminated before direct sunlight enters the camera lens. Illumination of this portion generates a signal which is used to close the shutter.

It is noted that the area of the photoresistor initially illuminated is just as large as if the opaque disc had been omitted, yet the area illuminated by the diffuse light from a bright cloud is much smaller with the disc than without. This fact makes it possible to adjust the response of the apparatus so as to close the shutter before direct sunlight enters the camera, yet to allow the shutter to remain open when the camera is pointed toward a bright cloud.

For a clearer understanding of the invention reference may be made to the following detailed description and the accompanying drawings, in which.

Figure 1:
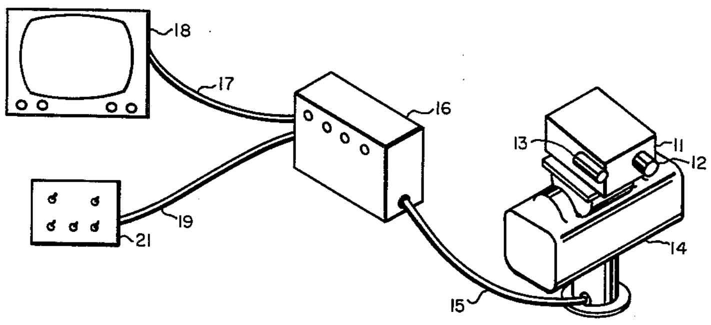
FIGURE 1 shows, in more or less block diagram form, a television camera including the invention which may be controlled from a remote location.

Referring first to FIGURE 1, there is shown a television camera 11 including an objective lens 12 and a cylindrical tube 13 mounted on one side of the camera 11 parallel to the optical axis of the lens 12. The entire camera is mounted on a pan and tilt assembly 14 which includes the necessary bearings, motors, etc. to enable the entire camera to be controlled in pan and tilt from a remote location. A cable 15 connects the camera 11 and assembly 14 to a camera control unit 16 which includes suitable power supplies, waveform generators, amplifiers, etc. necessary for operation of the camera 11. A cable 17 connects the camera control unit 16 to a monitor 18 upon which the operator can see the scene viewed by the camera 11. Another cable 19 connects the camera control unit 16 to a control panel 21 by means of which the operator can control the pan, tilt, focus, etc. of the camera 11.

Figure 2:
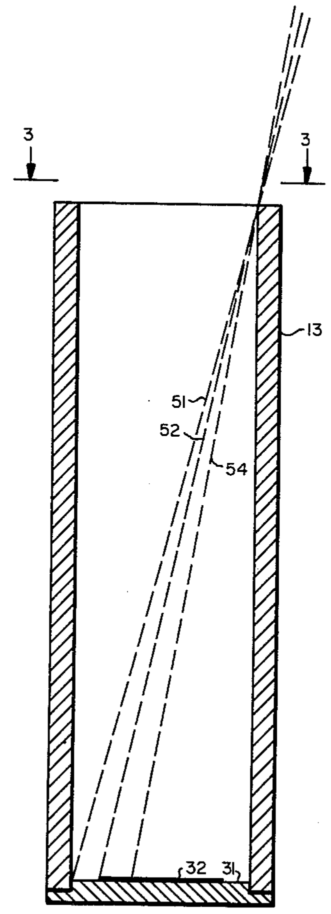
FIGURE 2 is a cross-section view of light-responsive apparatus in accordance with the invention.
Figure 3:
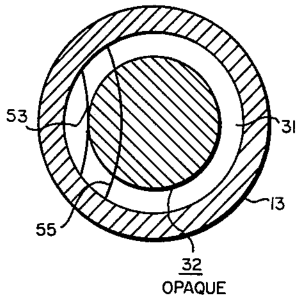
FIGURE 3 is a plan view taken on the plane 3—3 of FIGURE 2.

Referring now to FIGURE 2, there is shown in cross section the cylindrical tube 13 into one end of which is positioned a photoelectric element 31. Various kinds of photosensitive devices could be used but at present it is preferred that the element 31 be a photoresistor, that is, an element the resistance of which decreases as the incident light increases. The element 31 may comprise a flat ring or wide ring of photosensitive material or, more simply, may comprise the usual circular element, an inner circle of which is covered by an opaque disc 32, as shown in both FIGURES 2 and 3, leaving an active surface in the form of a flat washer, flat strip, or planar annulus.

Figure 4:
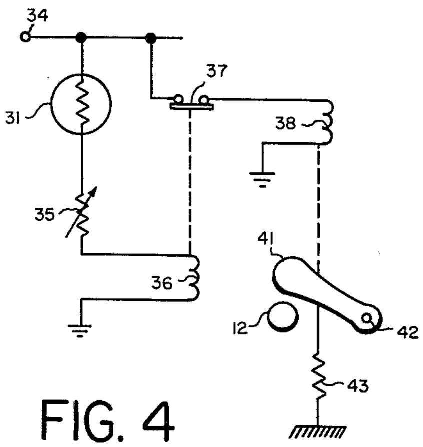
FIGURE 4 is a schematic diagram of the shutter control circuit.

Referring now to FIGURE 4, one terminal of the photoresistor 31 is connected to a source 34 of direct current while the other terminal is connected, through a variable resistor 35, to one terminal of the operating winding of a sensitive relay 36, the other terminal of which is grounded. The relay 36 is provided with a set of normally closed contacts 37, one terminal of which is connected to the source 34 and the other terminal of which is connected to one terminal of the operating winding of a solenoid 38, the other terminal of which is grounded.

The camera lens 12 is shown schematically in FIGURE 4 and has associated therewith a shutter 41 pivoted at 42 and mechanically connected to a spring 43 which urges the shutter 41 to a closed position covering the lens 12.

The shutter is also mechanically connected to the core of the solenoid 38 so that when the solenoid 38 is energized, the shutter 41 is opened, that is, it is drawn, against the urging of the spring 43, away from the lens 12. It will be understood that the showing of the shutter 41 is schematic and that any kind of shutter spring or gravity biased to a closed position can be used.

The mode of operation is obvious from FIGURE 4. With no power applied, the spring 34 holds the shutter 41 closed. Provided that the camera is not pointed toward the sun, the photoresistor 31 has a very high resistance so that when power is applied, this high resistance prevents the flow of current of a sufficient magnitude to operate the relay 36. Accordingly, the contacts 37 remain closed and current flows through them to the solenoid 38 which opens the shutter 41. Normal operating conditions are now established. If the camera is now turned so that sunlight strikes the photoresistor 31, its resistance will decrease, allowing sufficient current to flow to operate the relay 36 thereby opening the contacts 37, deenergizing the solenoid 38 and allowing the spring 43 to close the shutter. The amount of current flowing through the relay winding 36 for any resistance of the photoresistor 31 can be adjusted by varying the resistor 35, thereby determining the area of the photoresistor which must be exposed to sunlight to cause the shutter to be closed.

Returning to FIGURES 2 and 3, the details of the operation can be explained and understood most readily by considering a specific example. Let us assume, for illustrative purposes, that the camera lens 12 views an included angle of 20 degrees, or 10 degrees about the axis. The apparatus must be designed and adjusted to close the shutter before the optical axis is directed within 10 degrees of the sun. In the example illustrated in FIGURE 2, the diameter of the photoresistor 31 (and the inside diameter of the tube 13) was 0.75 inches; the opaque disc 32 had a diameter of approximately 0.53 inches so as to cover about one-half the area of the sensitive element; and the length of the tube 13, from the surface of the photoresistor 31 to the top was about 2.8 inches. With these dimensions sunlight just starts to strike the edge of the photoresistor 31 when rays from the sun make an angle of 15 degrees with the axis of the tube 13. Such a ray is indicated by the dotted line 51.

As the camera is turned nearer to the sun, the area illuminated will increase. At about 13 degrees, as shown by the line 52 of FIGURE 2, the area illuminated will be bounded by the curved line 53 of FIGURE 3, touching the disc 32. It is important to note that at this time the illuminated area is the same as if the disc 32 were absent. As the camera continues to approach the sun, light strikes the disc 32 and at 10 degrees, as indicated by the line 54 of FIGURE 2, the illuminated area is bounded by the curved line 55 of FIGURE 3.

As mentioned before, the apparatus must close the shutter before the camera is aligned within 10 degrees of the sun but at the same time closure should be delayed as long as possible so that bright clouds will not actuate the mechanism. Considering a reasonable rate of rotation of the camera (360 degrees in 20 seconds) and a reasonable response time for the relays and shutter (0.1 second), the resistor 35 (FIGURE 4) should be adjusted so that the relay 36 starts to operate just before the sun's rays make an angle of 12 degrees with the axis of the tube 13, say between 13 and 12 degrees.

Figure 5:
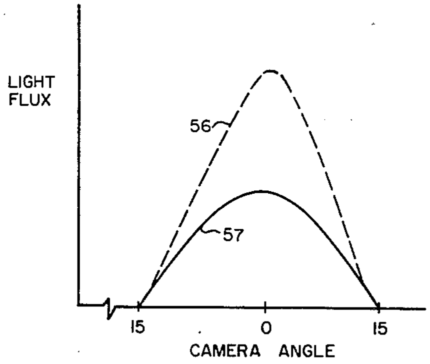

FIGURE 5 shows the total light flux falling on the photosensitive element 31 as a function of the angular position of the camera. The curve 56 shows the total flux which would reach the photosensitive element 31 in the absence of the opaque disc 32, as the camera scans an area of the sky including the sun. The curve 57 shows the total light flux reaching the element 31 when arranged in accordance with FIGURES 2 and 3 with the disc 32 in place. The maximum occurs in each case, of course, when the camera points directly toward the sun, that is, when the axis of the tube 13 is aligned with the sun's rays. It is noted that at this position the maximum of curve 57 is half that of curve 56 although when the angle approaches 15 degrees the curves coincide, because, as previously pointed out, the same area is illuminated in each case.

Figure 6:
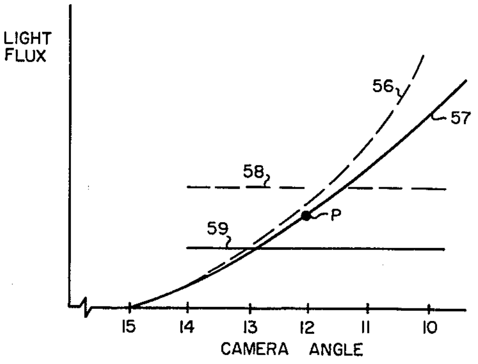
FIGURES 5 and 6 are graphs useful in explaining the invention.

FIGURE 6 shows a portion of the curves 56 and 57 to an enlarged scale. Also shown are curves 58 and 59 which represent a diffuse intensity level which will not damage the camera. Such diffuse light might originate from cloud cover in front of the sun or might be light reflected from a white cloud illuminated by the sun. In either case, the source is diffuse and the flux reaching the element 31 does not vary greatly with small changes in camera angle. The curve 58 represents the safe level reaching the element 31 in the absence of the disc 32, while the curve 59, having half the amplitude, represents the safe level reaching the element 31 with the disc 32 in place.

Considering the situation in the absence of the disc 32, the curves 56 and 58 show that it is difficult, if not impossible, to adjust (by means of the resistor 35, FIGURE 4) the light level to which the apparatus responds so as to insure closure of the shutter before sunlight can damage the camera while at the same time maintaining the shutter open when the camera is directed toward a bright cloud. On the other hand, curves 57 and 59 show that, with the opaque disc 32 in place, the adjustment is far less critical and can be made, for example at the point P, so as to close the shutter before direct sunlight can damage the camera while allowing the shutter to remain open when the camera is directed to a diffuse bright source such as a white cloud. This adjustment is possible because the disc 32 greatly reduces the response of the photosensitive element to a diffuse source while the response to direct sunlight in the critical region is reduced little, if at all.

It is believed that the invention will have its greatest application in connection with remotely-controlled television cameras because of the greater likelihood of inadvertent exposure to the sun. However, the invention will operate equally well with any camera, whether for television or for still or motion pictures or whether fixed or locally or remotely controlled.

Although a specific embodiment of the invention has been described in considerable detail for illustrative purposes, many modifications can be made within the spirit of the invention. For example, the length of the tube and the diameters of the tube, the photosensitive element and the opaque covering can be selected or made adjustable to accommodate various camera lenses. As another example, the tube in some cases might have a cross section other than circular, for example, rectangular, to correspond to the scanned area of the camera tube, with a central rectangular area inactive or masked. Many other modifications will occur to those skilled in the art. It is therefore desired that the protection afforded by Letters Patent be limited only by the true scope of the appended claims.

What is claimed is:

1. In combination with a camera including a lens and a shutter, protective apparatus, comprising,
  - a hollow tube mounted on said camera with its axis parallel to the optical axis of said camera,
  - said tube having one end open and facing in the same direction as said lens,
  - a photosensitive element mounted in the other end of said tube with its active surface facing said one end,
  - said active surface being in the form of a flat strip around the periphery of said tube, and
  - means operatively connected to said element for closing said shutter in response to a predetermined amount of light incident on said surface.

2. In combination with a camera including a lens and a shutter, protective apparatus, comprising, a hollow cylindrical tube mounted on said camera with its axis parallel to the optical axis of said camera,
said tube having one end open and facing in the same direction as said lens,
a photosensitive element mounted in the other end of said tube with its active surface facing said one end,
said active surface of said element being in the form of a planar annulus,
and means operatively connected to said element for closing said shutter in response to a predetermined amount of light incident on said surface.

3. In combination with a camera including a lens and a shutter, protective apparatus, comprising,
a hollow cylindrical tube mounted on said camera with its axis parallel to the optical axis of said lens,
said tube having one end open and facing in the same direction as said lens,
a photosensitive element mounted in the other end with its active surface facing said one end,
the exposed active surface of said element having the shape of a wide ring with its outer edge adjacent to the inner surface of said tube,
the ratio of the diameter of said tube to its length defining the tangent of an angle which is greater than one-half the viewing angle of said lens,
and means operatively connected to said element for closing said shutter in response to a predetermined amount of light reaching said surface.

4. In combination with a camera including a lens and a shutter, protective apparatus, comprising,
a hollow cylindrical tube mounted on said camera with its axis parallel to the optical axis of said lens,
said tube having a first end which is open and which faces in the same direction as said lens,
said tube having a second end,
a photosensitive element mounted in said second end with its active surface facing said first end,
the exposed active surface of said element having the shape of a flat washer with its outer surface adjacent to the inner surface of said tube,
the diameters of said tube and said element and the length of said tube being selected with regard to the viewing angle of said lens so that light rays may strike said element even although they make an angle with said axes which is greater than one half the included viewing angle of said lens,
and means operatively connected to said element for closing said shutter in response to a predetermined amount of light reaching said surface.

5. In combination with a camera including a lens and a shutter, protective apparatus, comprising,
a hollow cylindrical tube mounted on said camera with its axis parallel to the axis of said lens,
said tube having one end open and facing in the same direction as said lens,
a photosensitive element having a circular active surface mounted with said surface substantially closing said other end of said tube and facing said one end of said tube,
an opaque disc covering the central portion of said surface leaving an active area in the form of a planar annulus,
and means operatively connected to said element for closing said shutter in response to a predetermined amount of light incident on said active area.

6. In combination with a television camera including a lens and a shutter and remotely controllable in pan and tilt, protective apparatus, comprising,
a hollow cylindrical tube mounted on said camera with its axis parallel to the optical axis of said lens,
said tube having one end open and facing in the same direction as said lens,
a photosensitive element having an active surface in the shape of a plane annulus mounted in the other end of said tube with said surface facing said one end,
the diameters of said tube and said element and the length of said tube being selected with regard to the viewing angle of said lens so that the greatest angle with said axes of a ray of light which can strike said surface exceeds one half the included viewing angle of said lens,
actuating means operatively connected to said element for closing said shutter in response to light striking said surface,
and means for adjusting the response of said actuating means to various amounts of light incident of said surface.

No references cited.

DAVID G. REDINBAUGH, *Primary Examiner.*